March 31, 1931. A. P. THURSTON 1,798,913
AIRCRAFT, SUBMARINE, AND OTHER TOTALLY IMMERSED CRAFT OR STRUCTURES
Filed June 5, 1928 9 Sheets-Sheet 1
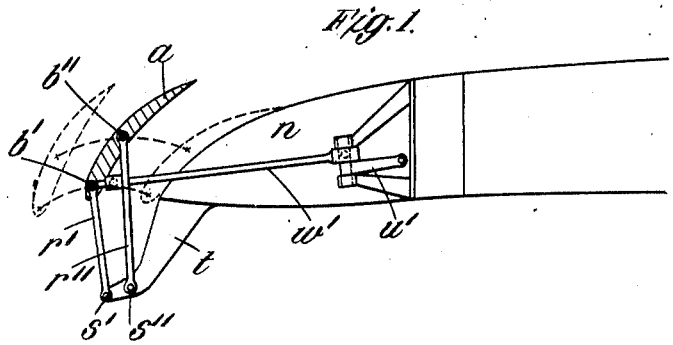
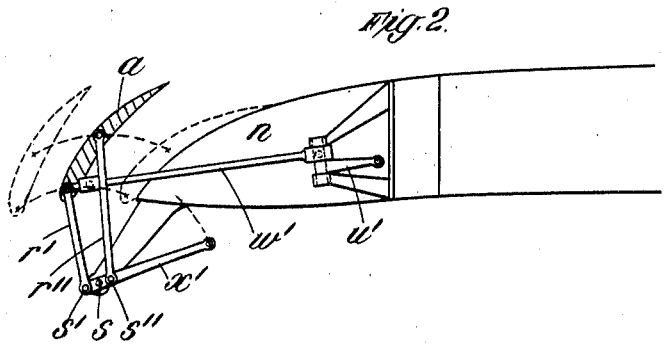
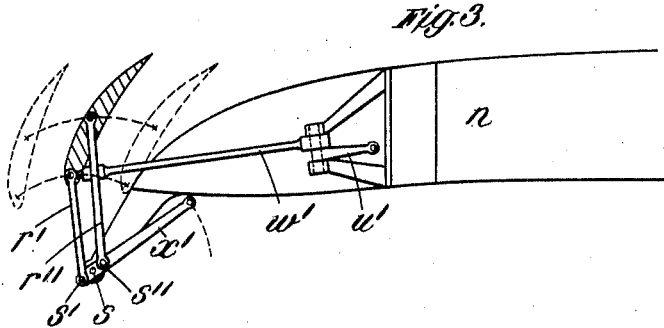
Albert Peter Thurston
INVENTOR
his ATTY.

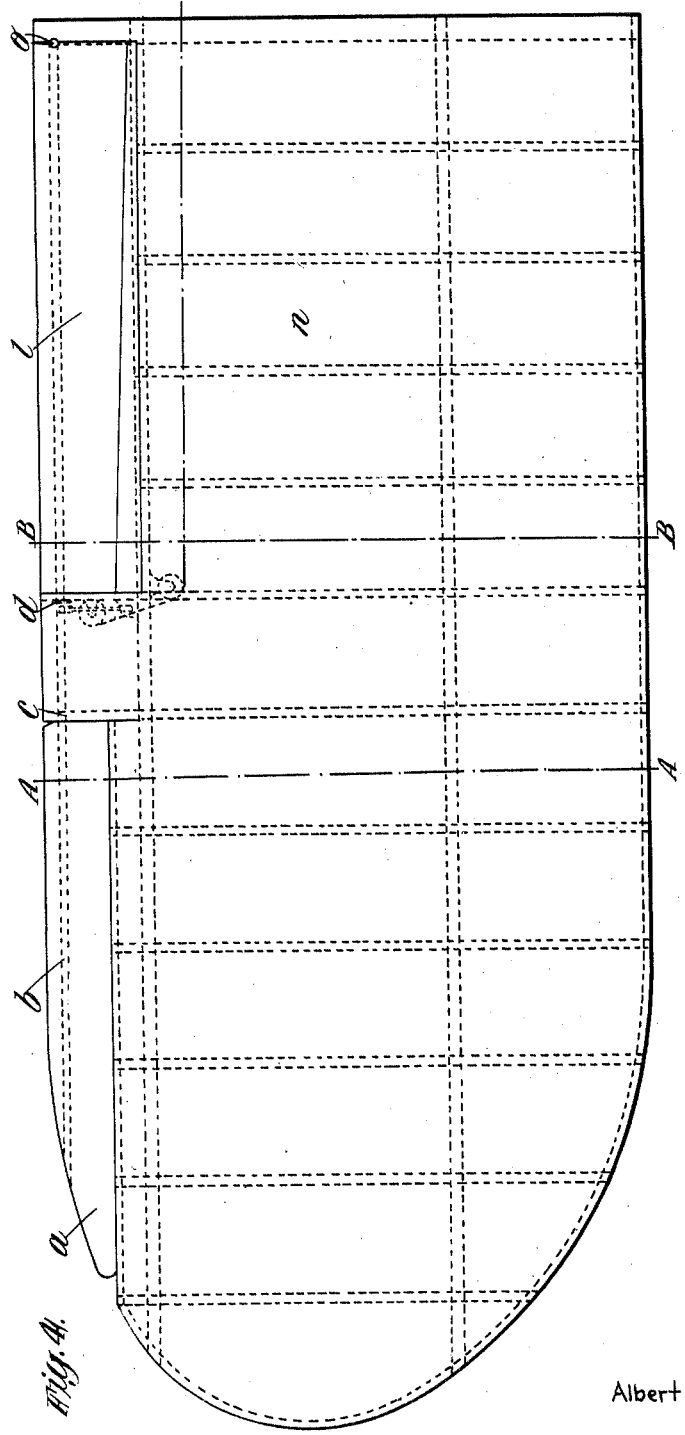
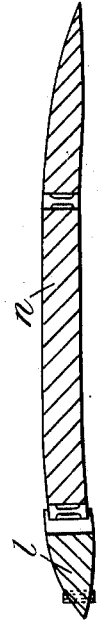
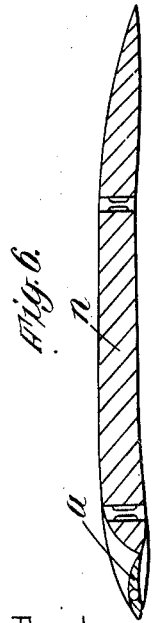

March 31, 1931.  A. P. THURSTON  1,798,913
AIRCRAFT, SUBMARINE, AND OTHER TOTALLY IMMERSED CRAFT OR STRUCTURES
Filed June 5, 1928  9 Sheets-Sheet 3
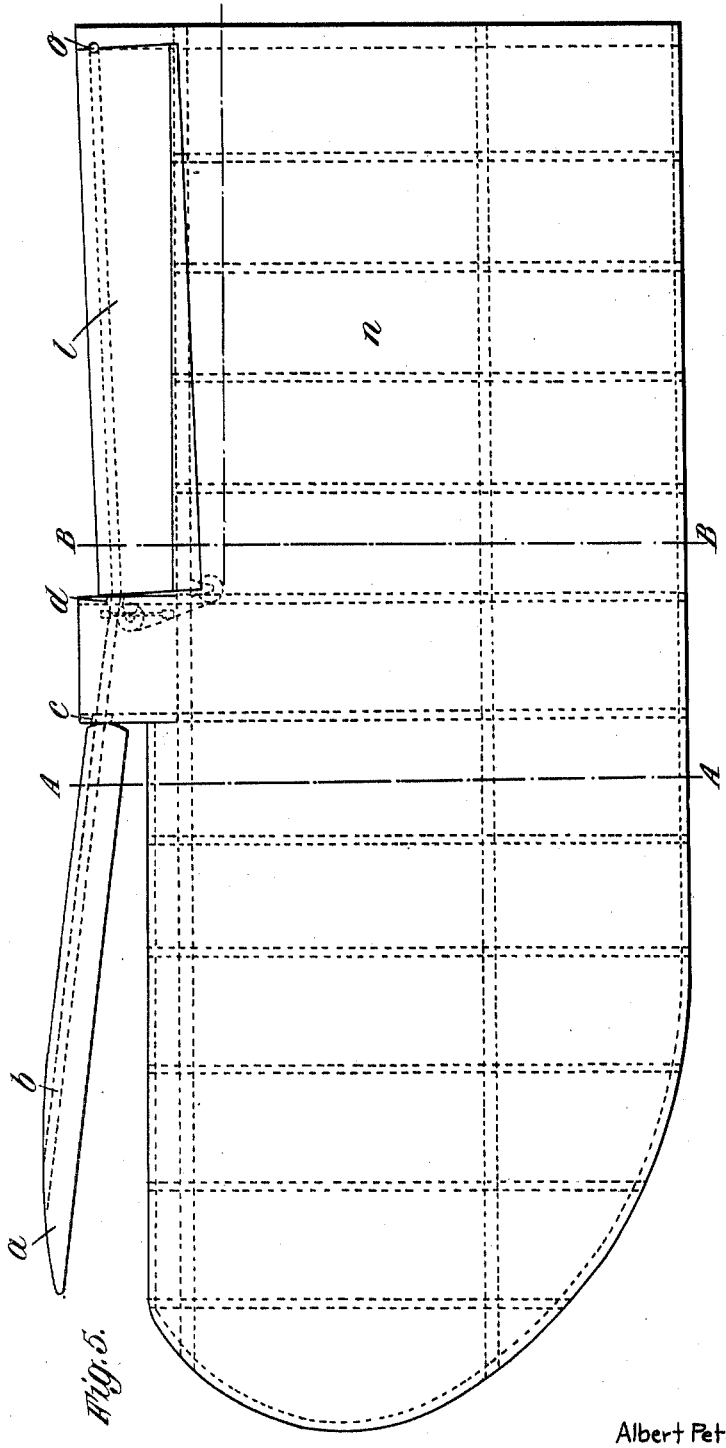
Albert Peter Thurston
INVENTOR
ATT'Y.

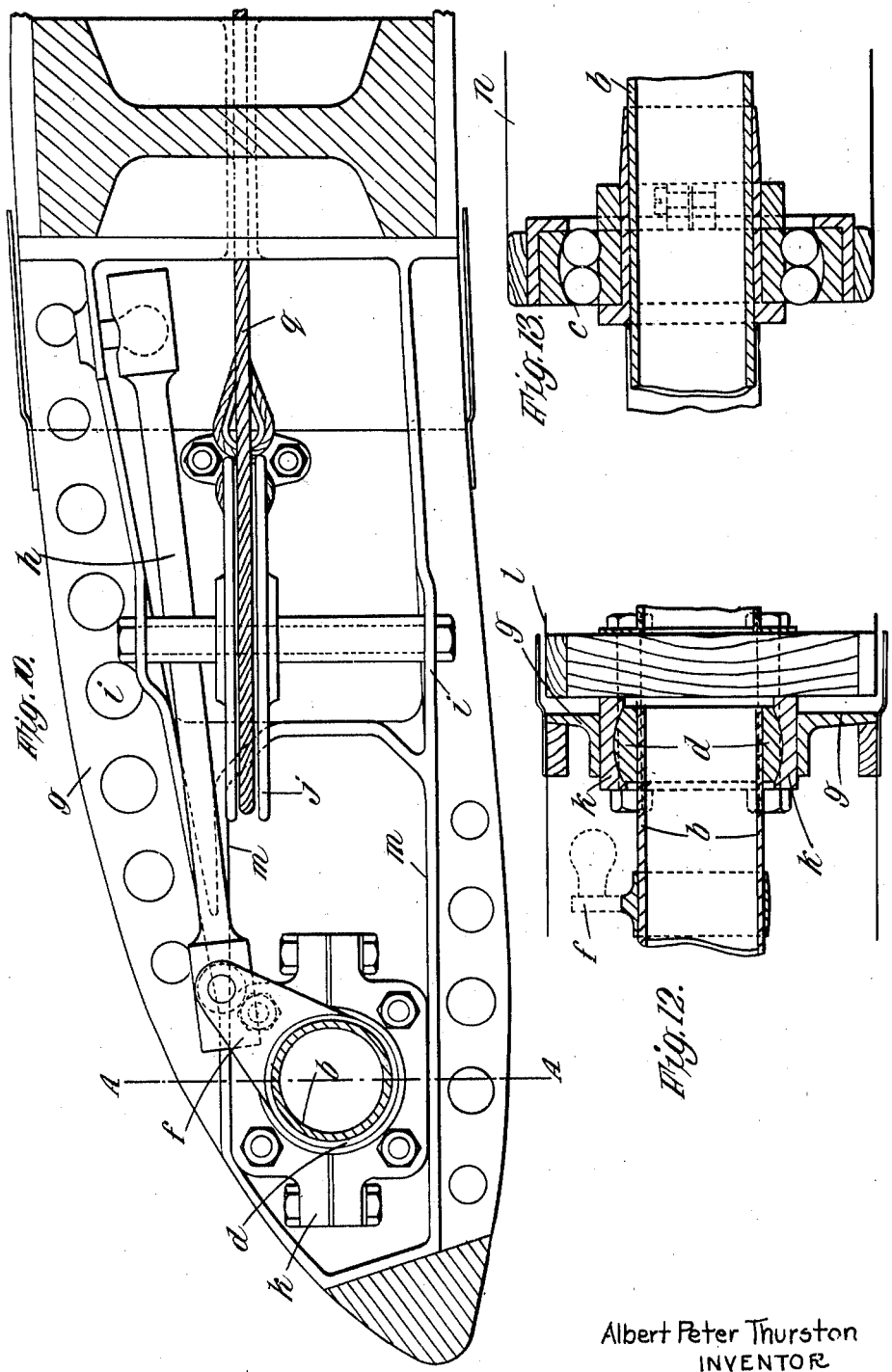

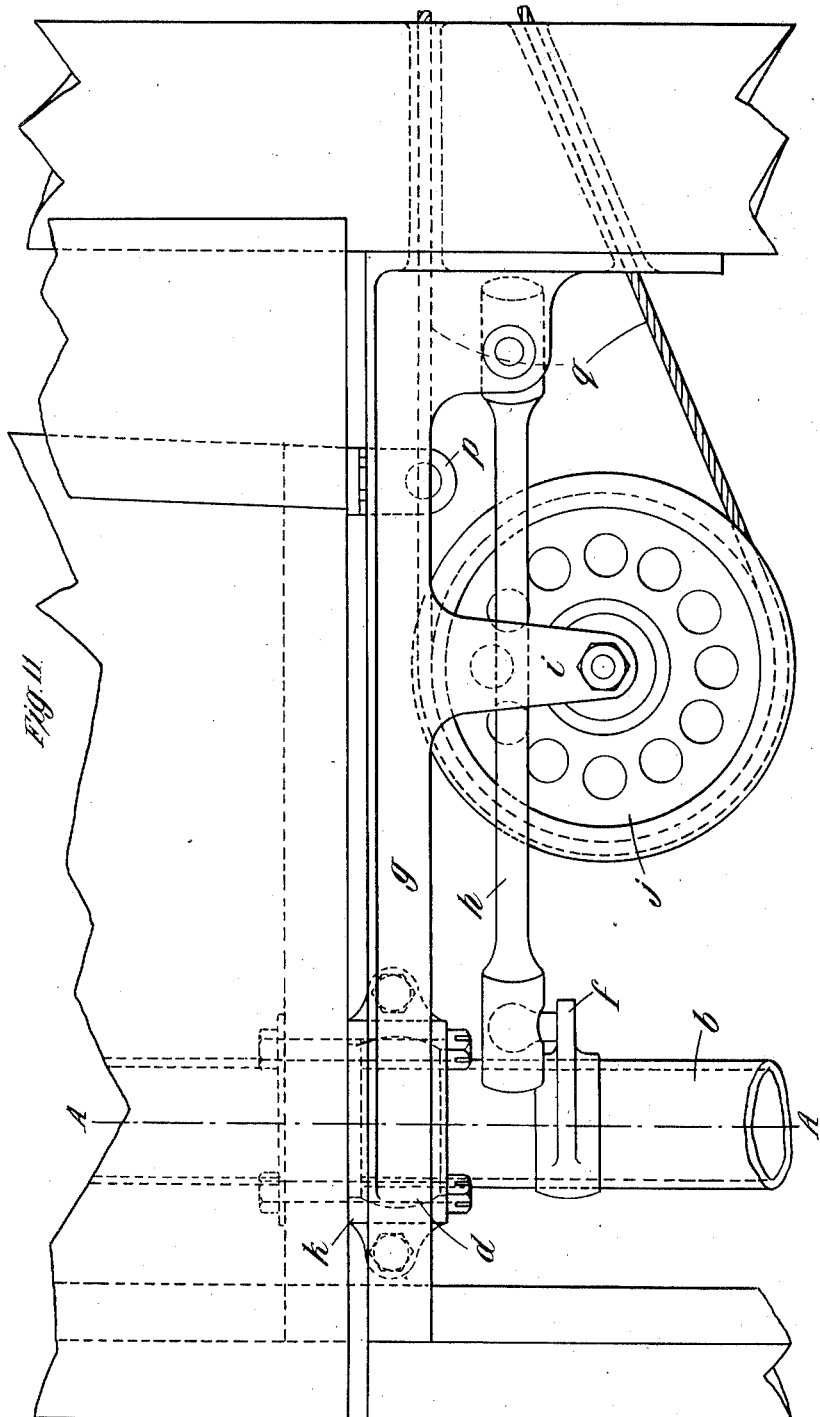

March 31, 1931.  A. P. THURSTON  1,798,913
AIRCRAFT, SUBMARINE, AND OTHER TOTALLY IMMERSED CRAFT OR STRUCTURES
Filed June 5, 1928    9 Sheets-Sheet 6
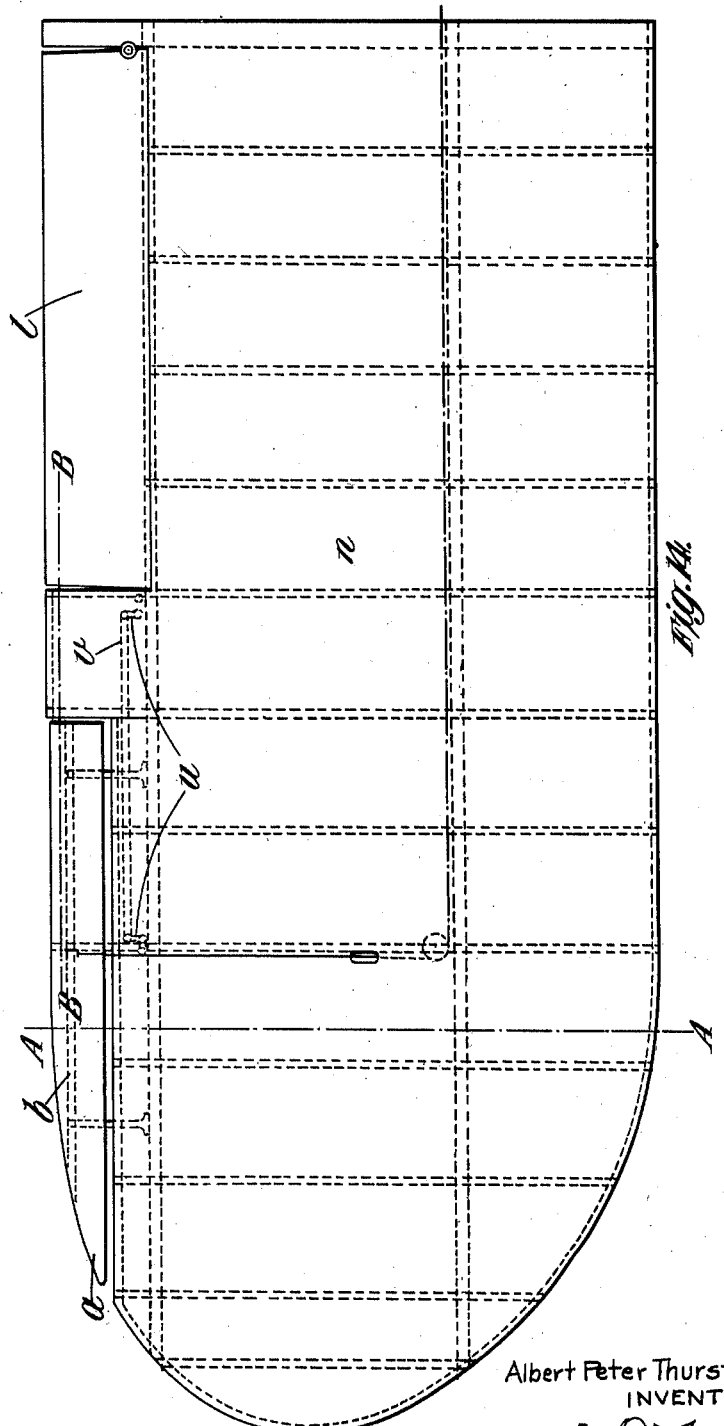
Albert Peter Thurston
INVENTOR
By Otto_____
his ATTY.

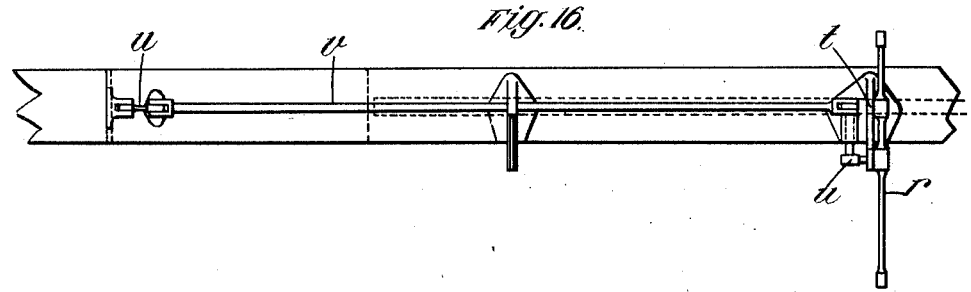
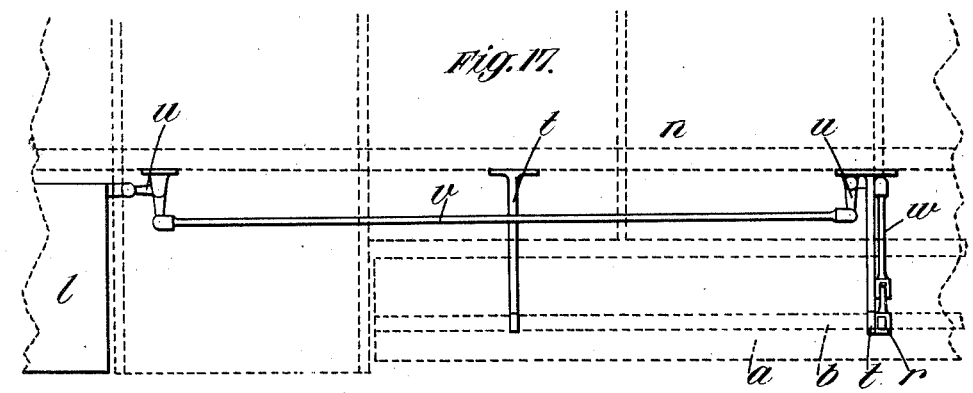
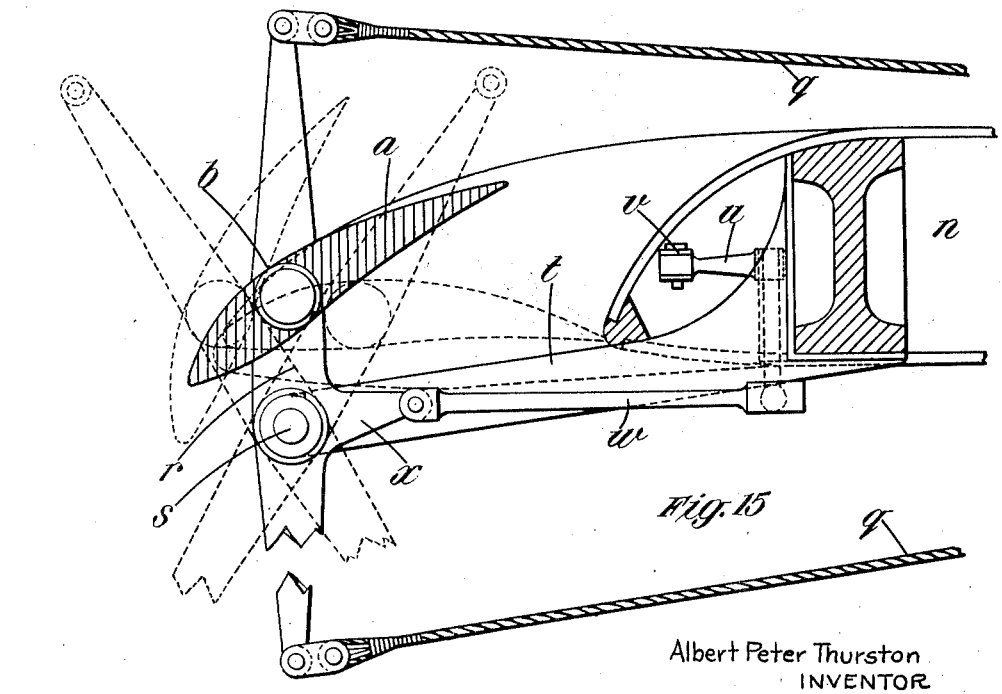
Albert Peter Thurston
INVENTOR

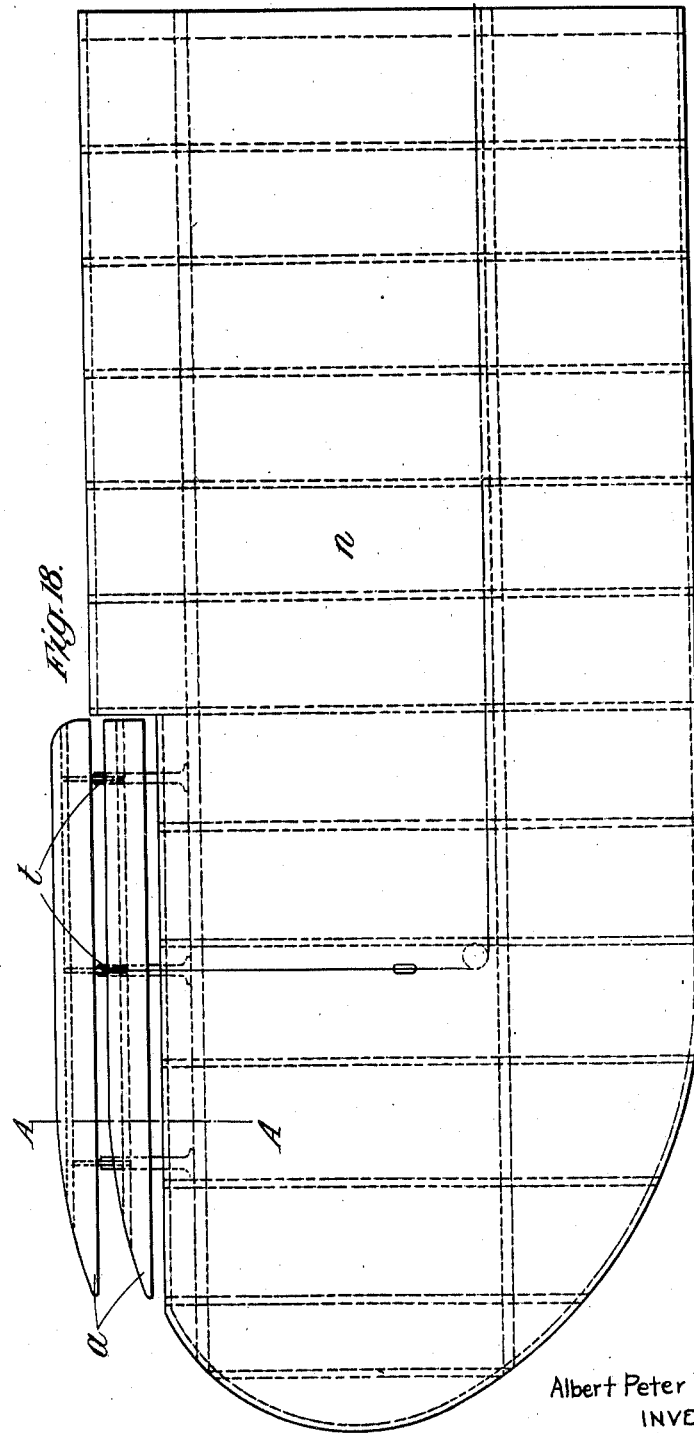

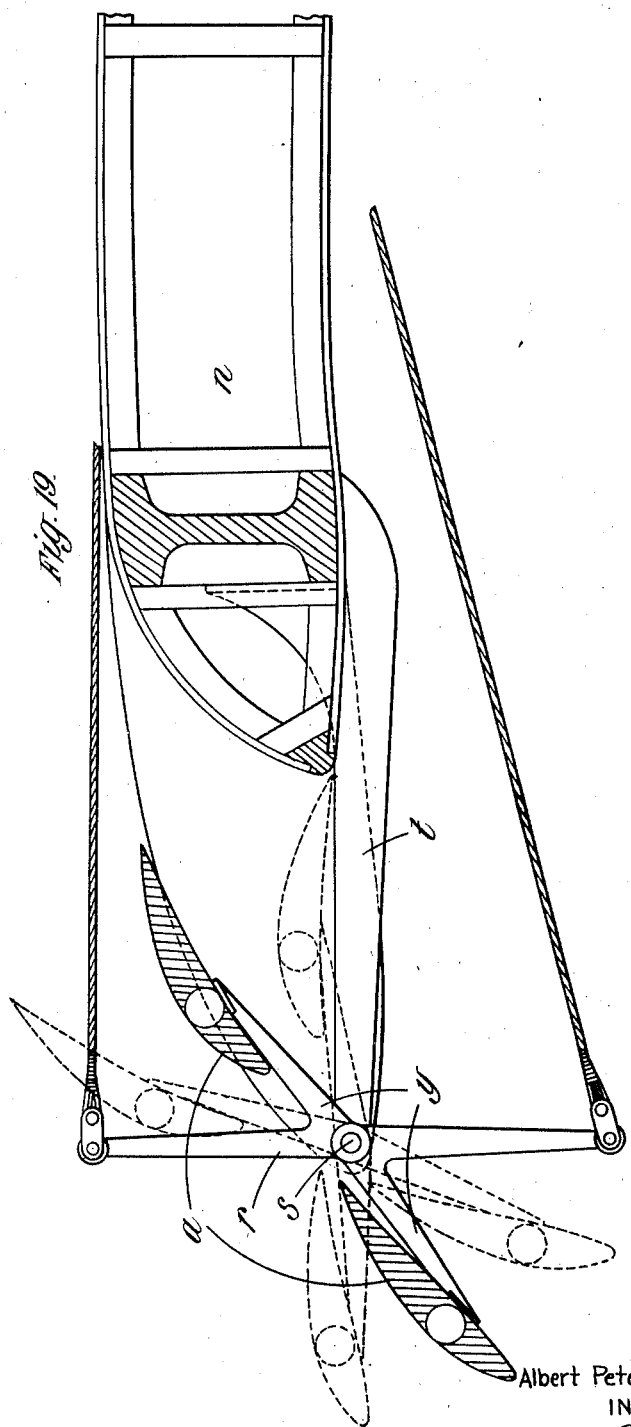

Patented Mar. 31, 1931                                                     1,798,913

UNITED STATES PATENT OFFICE

ALBERT PETER THURSTON, OF LONDON, ENGLAND

AIRCRAFT, SUBMARINE AND OTHER TOTALLY IMMERSED CRAFT OR STRUCTURES

Application filed June 5, 1928, Serial No. 283,004, and in Great Britain February 2, 1928.

This invention relates to an improvement in or modification of the invention set forth in my prior British patent specification No. 180,359.

It has been suggested previously to pivot alulas or small planes on vertical pivots above the main planes so as to be capable of being projected beyond the forward edges of the main planes, these alulas having been interconnected so as to thrust out one thereof whilst the other was retracted. It has also been suggested to mount pivotally independently operable alulas or small planes at the forward edge of the main planes, these alulas having been positively guided so that the negative inclination of the alulas was increased with the amount of projection.

According to the invention, aircraft, submarines, hydroplanes, and other totally immersed craft or structures are provided with alulas or small wings mounted in the normal neutral position at a negative angle in front of or above the leading edges of the outer portions of the main wings and to permit the alulas to ride neutrally in their normal position without lift or depression, whilst means are provided for controlling the inclination and projection of the alulas in such a manner that the inclination and/or projection of the alula or alulas on one side of the body of the machine is or are increased whilst the inclination and/or projection of the alula or alulas on the other side is simultaneously and correspondingly decreased.

Each alula is preferably connected to its corresponding wing in such a way that as the width of the gap is increased the negative inclination of the alula is also increased and as the width of the gap is decreased the negative inclination of the alula is also decreased. This ensures a greater increase of head resistance on the side of the machine which it is desired to depress and cause the machine to turn in the direction in which it is being banked. The alulas thus serve the purpose of ailerons and rudder.

Each alula may be balanced in any convenient way, for example by a movable front edge of the corresponding wing or by one or more alulas fixed, at negative angles, to it in front of its pivoting axis, and with a gap between.

Each alula may be connected to its corresponding wing in such a way that its negative inclination will increase at a greater rate relative to its travel when projected forwards from the normal position than when retracted from the said position.

Additional means controlled in any convenient way such as by the backward and forward motion of the control levers may be provided to allow the alulas on both sides to be projected or retracted together independently of the differential control to enable the wing to be converted from a high speed to a high lift wing and to assist in the longitudinal control.

Means may also be provided for controlling or varying at will the negative inclination of the alulas independently from the means controlling the projection. This allows any desired combination of rudder, aileron and elevator effect to be obtained. Obviously, with this arrangement, the rate of variation of inclination of the alulas with a constant amount of projection may be varied as desired by the simple expedient of adjusting the independent control of the inclination of the alulas.

The means for enabling the various motions of the alulas above described to be controlled are so well known and obvious to anyone experienced in aircraft design that it is unnecessary to describe them as they form no part of the invention. These controlling means may be similar to those described in the applicant's prior British patent specification No. 180,359.

Examples of construction according to my invention are illustrated in the accompanying drawings wherein—

Fig. 1 is a side view of a section of a wing fitted with an alula in normal position.

Fig. 2 is a side view of a modified arrangement with the alula in normal position.

Fig. 3 is a side view of the arrangement shown in Fig. 2 with the negative inclination of the alula increased.

Fig. 4 is a plan of a wing fitted with an end pivoted alula in the closed position.

Fig. 5 is a corresponding plane with the alula in an open position.

Fig. 6 is a section through the line AA Fig. 4.

Fig. 7 is a section through the line BB Fig. 4.

Fig. 8 is a section through the line AA Fig. 5.

Fig. 9 is a section through the line AA when the alula is in the normal position.

Fig. 10 is a sectional side elevation, through the line CC to a larger scale, showing details of the mechanism for operating the alula shown in the preceding figures.

Fig. 11 is a plan of the details shown in Fig. 10.

Fig. 12 is a section on the line AA Fig. 10 showing the sliding bearing.

Fig. 13 is a section on the line AA Fig. 10 showing the swivel ball bearings.

Fig. 14 is a plan of a wing fitted with a balanced parallel alula in the normal position.

Fig. 15 is a section on the line AA Fig. 14 to a larger scale showing details of the mechanism for controlling the alula.

Fig. 16 is a sectional elevation along the line BB Fig. 14 to a somewhat larger scale showing the mechanism for balancing the alula.

Fig. 17 is a plan of Fig. 16.

Fig. 18 is a plan of a wing fitted with two parallel alulas balancing each other.

Fig. 19 is a section along the line AA Fig. 18 to a larger scale showing the mechanism for operating the alulas.

Referring to Fig. 1, each alula $a$ is pivoted above the front edge of each wing $n$ by means of two links $r'$, $r''$ at each end of the alula. The front pair of links $r'$ are not necessarily of the same length as the rear pair of links $r''$. The front pair of links $r'$ are pivoted to the front edge of the alula $a$ and to projecting lugs $t$ depending from the front edge of the plane, and these links are interconnected by any known form of linkage $w'$, $u'$, or cable operated by side motion of the control lever or control wheel as with ordinary type aileron control so that as the alulas on one side are projected those on the other side are retracted. If the front pair of links $r'$ are shorter than the rear pair $r''$ by a suitable amount or the pivoting point of the front links is suitably positioned in relation to the rear links, the negative inclination of the alula is suitably increased as it is projected and the negative inclination of the gap between it and the leading edge of the plane is increased as the gap is widened. In normal position the gap is of such a width and inclination that there is no lift on the alula.

In a modification shown in Figs. 2 and 3, of the above example of construction a lever $x'$ is pivoted to each lug $t$ on the pivot $s$ and the inclination of these levers $x$ may be controlled by a wheel or other device either on the control lever or suitably situated in the cockpit so that the amount of rotation of the alula relative to its projection may be varied at will. The alulas are pivoted to these inclinable levers $x'$ by pairs of links $r'$, $r''$.

In the above example of construction the downward inclination of the alula is preferably controlled by turning the control wheel. When the control wheel is central and the alulas are in the normal position of no lift, a rotation of the wheel increases the negative inclination of one alula and decreases the inclination of the other alula thus causing a steering or rudder effect.

When the control lever is over to one side, one alula is projected and the other retracted and a similar rotation causes more aileron effect and less rudder effect. Hence a natural and simple method is obtained for controlling a flying machine or other totally immersed craft. Small alula projection or retraction plus large angular rotation is equivalent to a rudder effect and large alula projection or retraction plus small angular rotation is equivalent to an aileron effect.

The alulas may be of any convenient or efficient shape in cross section which experience may prove most suitable; but they are preferably of cambered wing or aerofoil shape adapted to register with the upper or lower surfaces of the main plane to which they are attached. From experience, the best position of the alula appears to be immediately in front of the leading edge of the main plane so that when in the extreme retracted position the rear edge of the alula just clears the leading edge of the main plane.

For slow flying and landing with the main plane at small angles the alulas may be projected forwards and rotated upwards but for slow flying and landing with the main plane at a large angle it is merely necessary to retract the alulas somewhat and rotate them to decrease their negative inclination in order to narrow the gap and decrease its negative inclination. The first mentioned method of slow flying and landing enables the machine to be controlled longitudinally independently of the elevators and more efficiently than by the existing method of elevator control because the controlling surfaces being in front of the centre of gravity of the machine instead of behind the centre of gravity, the controlling force necessary to increase the inclination of the main plane acts upwards and assists in sustaining the machine instead of downwards as in the case of elevator control.

According to the example of construction shown in Figs. 4 to 13 inclusive an alula $a$ is mounted on a shaft $b$ in a swivel bearing $c$ and the said shaft is slidably mounted in a bearing $d$ mounted in a transverse slide $k$ so that the shaft $b$ is swung radially about the swivel bearing $c$ and at the same time rotated by a radius arm $f$ which is connected to a fixed part of the casing $g$ by a link $h$. The fixed casing $g$ is provided with lugs $i$ between which a cable pulley $j$ is mounted. The slide $k$ carrying the radial bearing $d$ is connected to the movable leading edge $l$ of the main plane $n$ and slides between guides $m$ in the fixed casing $g$. The movable leading edge $l$ is pivoted to the main plane $n$ at $o$ and is provided with an eye $p$ projecting within the fixed casing $g$ and is connected to the cable $q$ which is operated in any known way from the cockpit to operate the alulas.

Suitable means for operating this cable are described in the applicant's British patent specification No. 180,359, but any means may be employed.

In operation when the alula is extended from the normal position as shown in Fig. 8 it is rotated by means of the radius arm $f$ and link $h$ at a greater rate relative to its forward travel than when it is retracted towards the position shown in Fig. 6.

According to the further example of construction shown in Figs. 14 to 17 inclusive a parallel moving alula $a$ is mounted on a shaft $b$ which is carried by arms $r$ pivoted at $s$ to lugs $t$ projecting from the main plane $n$. The upper and lower ends of the central arm $r$ are controlled by cables $q$ operated from the cockpit in any known way. The alula $a$ is balanced from the movable leading edge $l$ of the main plane $n$ by means of bell crank levers $u$, rod $v$, and link $w$ connected to a radius arm $x$ projecting from the central arm $r$ and the arm $x$ may be set out of line with the pivot $s$ and end of the corresponding bell crank lever $u$ so as to balance the drag of the alula in the normal position.

According to the further example of construction shown in Figs. 18 and 19 two alulas $a$ are mounted on arms $y$ of the arms $r$ on either side of the pivot $s$ so that the front alula is at a negative angle with the rear alula to form a negatively inclined gap between and to balance each other.

Experience has proved that the pivot point $s$ should be nearer the front alula than is shown in Fig. 19 if perfect balance is required.

In operation when the negative inclination of the alulas is decreased from the normal position shown in Fig. 19 the gap between the rear edge of the rear alula and the main plane is decreased and its negative inclination is decreased and vice versa.

The method of control of a flying machine according to this invention is as follows:—

In making a gentle turn the nose of the machine is put on the horizon by the elevator and the alula on the side to which it is desired to turn is moved forwards and simultaneously rotated downwards from the normal position. It is thus projected forwards into accelerated air acting on its top surface which causes the wing on that side to be depressed and at the same time exerts a force acting at a radius from the body tending to turn the machine towards that side in which the alula has been projected. The alula on the other side, at the same time, is operated in the opposite direction to cause the wing on that side to lift without exerting so great a drag as on the inner side. Thus the alulas combine the functions of aileron and rudder. Also since they act in accelerated air their action is more immediate and effective than in the course of ordinary aileron and rudder control, and the area of the alulas is considerably less than the area of corresponding aileron and rudders. Moreover by placing the controlling surfaces in front of the wing instead of behind a machine can be flown with more precision and satisfaction near obstructions, just as a motor can be driven with more precision by steering the front wheels. As the angle of the turn increases, the nose of the machine is kept on the horizon by increasing or decreasing the angle of one or other of the alulas, thus putting on a breaking couple on one side or the other of the machine.

Preferably this motion of the alulas is controlled by means of a wheel on the control lever. The machine is kept turning at a steep angle by pulling back the control lever thus raising the elevator now acting as a rudder. The correct bank is maintained by pulling back the control lever in a diagonal direction as heretofore in the way well known to aviators thus causing the lower aileron to lift and the upper aileron to depress.

The mechanism for operating and controlling the alulas may obviously be modified in many different ways without departing from the invention. All the above mechanisms and arrangements may be used on a reduced scale for submarines, hydroplanes and other totally immersed craft or structures operating in water.

I claim:—

1. The combination of a main sustaining body, laterally spaced smaller sustaining bodies for guiding and balancing said main sustaining body mounted in advance of the main body, means for varying the inclination of said smaller bodies, and means for swinging said smaller bodies forwardly and rearwardly, said smaller bodies being connected in a manner to cause complementary opposite movement of the same.

2. In a device of the class described, a main sustaining wing, an auxiliary wing mounted ahead of the main wing adjacent each end of the same, means for varying the inclination of said auxiliary wings, means for moving said auxiliary wings toward and from the main wing, and means connecting said auxiliary wings and maintained in complementary relation whereby when one auxiliary wing is moved in one direction the other auxiliary wing will be moved in the opposite direction.

3. In a device of the class described, a main sustaining wing, an auxiliary wing mounted at the front edge of the main wing adjacent each side of the same, means for varying the angle of inclination of each auxiliary wing, means for moving each auxiliary wing toward and from the main wing, means for balancing the auxiliary wings, and controlling means for the auxiliary wings so that when the auxiliary wing adjacent one end of the main wing is moved forwardly the auxiliary wing at the opposite end will be moved rearwardly a corresponding amount and when the angle of inclination of the auxiliary wing at one end of the main wing is varied the auxiliary wing at the opposite end would be correspondingly varied in an opposite manner.

4. In a device of the class described, a main sustaining wing, an auxiliary wing mounted ahead of the main wing adjacent each end of the same, means for varying the inclination of said auxiliary wings, independent means for moving said auxiliary wings toward and from the main wing, and means connecting said auxiliary wings and maintaining them in complementary relation whereby when one auxiliary wing is moved in one direction the other auxiliary wing will be moved in the opposite direction.

5. In a device of the class described, a main sustaining wing, an auxiliary wing mounted ahead of the main wing adjacent each end of the same, means for varying the inclination of said auxiliary wings, independent means for moving said auxiliary wings toward and from the main wing, means connecting said auxiliary wings and maintaining them in complementary relation whereby when one auxiliary wing is moved in one direction the other auxiliary wing will be moved in the opposite direction, and means for varying the rate of increase of inclination of the auxiliary wings for a fixed amount of forward or rearward movement of the same.

6. In a device of the class described, a main sustaining wing, an auxiliary wing mounted at the front edge of the main wing adjacent each side of the same, means for varying the angle of inclination of each auxiliary wing, means for moving each auxiliary wing toward and from the main wing, means for balancing the auxiliary wings, controlling means for the auxiliary wings so that when the auxiliary wing adjacent one end of the main wing is moved forwardly the auxiliary wing at the opposite end will be moved rearwardly a corresponding amount and when the angle of inclination of the auxiliary wing at one end of the main wing is varied the auxiliary wing at the opposite end would be correspondingly varied in an opposite manner, and means for maintaining the auxiliary wings in neutral position.

7. In a device of the class described, a main sustaining wing, an auxiliary wing mounted at the front edge of the main wing adjacent each side of the same, means for varying the angle of inclination of each auxiliary wing, means for moving each auxiliary wing toward and from the main wing, means for balancing the auxiliary wings, controlling means for the auxiliary wings so that when the auxiliary wing adjacent one end of the main wing is moved forwardly the auxiliary wing at the opposite end will be moved rearwardly a corresponding amount and when the angle of inclination of the auxiliary wing at one end of the main wing is varied the auxiliary wing at the opposite end will be correspondingly varied in an opposite manner, and resilient means for normally maintaining the auxiliary wings in neutral position in contact with the main wing but enabling them to move out of neutral position automatically with the machine at a large angle.

8. The combination of a main sustaining body, laterally spaced smaller sustaining bodies for guiding and balancing said main sustaining body mounted in advance of the main body, means for swinging the said smaller bodies forwardly and rearwardly, and independent means for varying the inclination of the said smaller bodies.

9. The combination of a main sustaining body, laterally spaced smaller sustaining bodies for guiding and balancing said main sustaining body mounted in advance of the main body, means for swinging the said smaller bodies forwardly and rearwardly, independent means for varying the inclination of the said smaller bodies, and resilient means for normally maintaining the auxiliary bodies in neutral position in contact with the main body but enabling them to move out of neutral position automatically with the machine at a large angle.

ALBERT PETER THURSTON.